US009182747B2

(12) United States Patent
Seydoux et al.

(10) Patent No.: US 9,182,747 B2
(45) Date of Patent: Nov. 10, 2015

(54) MEASURING THE PHASE OF RECEIVED SIGNALS

(75) Inventors: Jean Seydoux, Rio de Janeiro (BR); Libo Yang, Sugar Land, TX (US); Mark Kuchenbecker, Rosenberg, TX (US); Reza Taherian, Sugar Land, TX (US); Emmanuel Legendre, Sevres (FR); Jian Yang, Sugar Land, TX (US); Mark A. Fredette, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 269 days.

(21) Appl. No.: 13/525,234

(22) Filed: Jun. 15, 2012

(65) Prior Publication Data

US 2013/0080102 A1    Mar. 28, 2013

Related U.S. Application Data

(63) Continuation of application No. 13/266,988, filed as application No. PCT/US2010/032606 on Apr. 27, 2010, now abandoned.

(60) Provisional application No. 61/173,382, filed on Apr. 28, 2009.

(51) Int. Cl.
   *G04G 7/00* (2006.01)
   *G06F 19/00* (2011.01)
   *G01V 3/28* (2006.01)

(52) U.S. Cl.
   CPC .. *G04G 7/00* (2013.01); *G01V 3/28* (2013.01); *G06F 19/00* (2013.01)

(58) Field of Classification Search
   CPC ............. G01V 3/28; G01V 3/26; G01V 3/30; G06F 1/12
   USPC .......................................................... 702/89
   See application file for complete search history.

(56) References Cited

U.S. PATENT DOCUMENTS

| 4,577,150 | A   |    3/1986 | Schreuder |
| 4,600,994 | A   |    7/1986 | Hayashi |
| 4,899,112 | A   |    2/1990 | Clark et al. |
| 5,999,129 | A   |   12/1999 | Rose |
| 6,118,745 | A   |    9/2000 | Hutchins et al. |
| 6,711,230 | B1  |    3/2004 | Nicholls et al. |
| 7,020,791 | B1* |    3/2006 | Aweya et al. ................. 713/400 |
| 7,231,306 | B1* |    6/2007 | Rajan et al. ..................... 702/89 |

(Continued)

OTHER PUBLICATIONS

International Search Report and the Written Opinion for International Application No. PCT/US2010/032606 dated Nov. 30, 2010.

*Primary Examiner* — Mischita Henson
(74) *Attorney, Agent, or Firm* — John Vereb (57) ABSTRACT

The present disclosure relates to a method to determine the phase of a signal when transmitter and receiver circuits use separate clocks. A discrepancy between the separate clocks is determined, as is a correction factor between the separate clocks. The phase is determined using a measured time of arrival of the signal, the determined discrepancy, and the determined correction factor. A drift factor and an expected start time of a pulse sequence may be used to determine the discrepancy. A start time of a pulse within the pulse sequence is determined and used to determine the correction factor. The method works by either absolute synchronization of the separate clocks, or by making the measurements independent of clock synchronization.

21 Claims, 9 Drawing Sheets

(56) References Cited

U.S. PATENT DOCUMENTS

| | | |
|---|---|---|
| 7,292,109 B2 | 11/2007 | Haiut |
| 7,340,632 B2 * | 3/2008 | Park ............................. 713/401 |
| 7,433,435 B2 | 10/2008 | Nagaraja |
| 8,181,057 B2 | 5/2012 | Nichols et al. |
| 8,275,087 B2 | 9/2012 | Hadzic et al. |
| 8,866,633 B2 * | 10/2014 | Montgomery et al. .... 340/855.4 |
| 2002/0022465 A1 | 2/2002 | McCullagh et al. |
| 2005/0035875 A1 | 2/2005 | Hall et al. |
| 2006/0056563 A1 | 3/2006 | Aweya et al. |
| 2009/0217074 A1 * | 8/2009 | Nichols et al. ................ 713/401 |
| 2010/0266003 A1 * | 10/2010 | Patino-Studencka et al. ............................ 375/224 |

* cited by examiner

| | |
|---|---|
| $x_i = A \cdot \sin\left(2 \cdot \pi \cdot \dfrac{f_c}{f_s} \cdot k + \vartheta\right) + N_i$ | INCOMING SIGNAL OF AMPLITUDE A AND NOISE $N_i$ WITH $f_c$ AND $f_s$ AS CARRIER AND SAMPLING FREQUENCIES |
| $X_C = \sum_{k=1}^{n} x_i \cdot \cos\left(2 \cdot \pi \cdot \dfrac{f_c}{f_s} \cdot k\right)$ | CORRELATED COSINE WINDOW WHERE N IS THE WINDOW LENGTH (5000 SAMPLES AT 500kHz). NOTE THAT EACH xicos(ωk) IS COMPUTED AND STORED IN A 5000-SAMPLE LONG CIRCULAR ARRAY. $X_C$ IS THEN CALCULATED AS A RUNNING SUM OVER THAT ARRAY BY ADDING THE NEW PRODUCT AND REMOVING THE PREVIOUS 5000$^{th}$ SAMPLE TO MINIMIZE COMPUTATION LOAD |
| $X_S = \sum_{k=1}^{n} x_i \cdot \sin\left(2 \cdot \pi \cdot \dfrac{f_c}{f_s} \cdot k\right)$ | CORRELATED SINE WINDOW WHERE N IS THE WINDOW LENGTH (5000 SAMPLES AT 500kHz). NOTE THAT EACH xisin(ωk) IS COMPUTED AND STORED IN A 5000-SAMPLE LONG CIRCULAR ARRAY. $X_S$ IS THEN CALCULATED AS A RUNNING SUM OVER THAT ARRAY BY ADDING THE NEW PRODUCT AND REMOVING THE PREVIOUS 5000$^{th}$ SAMPLE TO MINIMIZE COMPUTATION LOAD |
| $A_i = \sqrt{X_C^2 + X_S^2}$ <br> $i_{max} = i[A_i = \max(A_i)]$ <br> $A = A_{i_{max}}$    $TOA = t_w + \dfrac{i_{max}}{f_s}$ | PHASE INDEPENDENT AMPLITUDE. PULSE AMPLITUDE IS TAKEN AS THE MAXIMUM AMPLITUDE OVER THE WINDOW. TOA (TIME OF ARRIVAL) IS THE SAMPLED TIME WITH RESPECT TO AN ARBITRARY RECEIVER REFERENCE TIME. $t_w$ IS THE WINDOW START TIME wrt TIME REFERENCE. |

MEASURING THE PHASE OF RECEIVED SIGNALS

CROSS-REFERENCE TO OTHER APPLICATIONS

This application is a continuation of U.S. patent application Ser. No. 13/266,988 filed Oct. 28, 2011, now abandoned, and entitled, "Measuring the Phase of Received Signals," which was filed under 25 U.S.C. §371 from international application number PCT/US2010/32606, having an international filing date of Apr. 27, 2010, now expired, and entitled, "Measuring the Phase of received Signals," which claims priority to and the benefit of U.S. Provisional Application No. 61/173,382, filed Apr. 28, 2009.

BACKGROUND

1. Technical Field

The present disclosure relates generally to the logging of subsurface formations surrounding a wellbore using a downhole logging tool, and particularly to making measurements with a modular logging tool while drilling, and using those measurements to infer one or more formation properties.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

Electromagnetic (EM) wave propagation in a medium is characterized by the magnetic permeability of the medium ($\mu$) and the complex dielectric permittivity ($\in^*$) given by, $$\varepsilon^* = \varepsilon_r - i\frac{\sigma}{\varpi\varepsilon_0} \text{ and} \quad (1)$$

$$\mu = \mu_r \mu_0. \quad (2)$$

$\in_r$ and $\mu^r$ are the permittivity and permeability of the medium relative to their corresponding values in free space ($\in_0$=8.8 $10^{-12}$, and $\mu_0$=1/(4$\pi$ $10^{-7}$)), $\omega$ is the angular frequency, and $\sigma$ is the conductivity. Those parameters affect the wave vector k, given by, $$k = \frac{\varpi}{c}\sqrt{\mu_r \varepsilon_r} \quad (3)$$

where c, the speed of light in vacuum, is given by, $$c = \frac{1}{\sqrt{\mu_0 \varepsilon_0}}. \quad (4)$$

Most rocks of interest are non-magnetic and therefore $\mu_r$ equals one. An EM measurement from a resistivity logging tool is related to k, which in turn is related to $\in_r$ and $\sigma$. The real and imaginary parts of $\in^*$ have different frequency dependencies. For example, the conductivity is typically constant until the frequency is above about 1 MHz, after which it increases slowly. The permittivity of rocks, on the other hand is very large (e.g., ~10) at sub-Hz frequencies, and decreases as the frequency increases, but eventually flattens out at frequencies around a GHz. The frequency dependence of permittivity is 1/f for frequencies up to approximately $10^4$ Hz, but between $10^4$ and $10^8$ Hz, it varies as 1/($f^\alpha$), where $\alpha$ is approximately 0.3. Since the imaginary part of $\in^*$ has an explicit 1/f dependence, the imaginary part dominates at low frequency and the real part dominates at high frequencies.

Most prior art low frequency resistivity tools have concentrated on the conductivity term of the complex permittivity and ignored the real part (which is known as the dielectric constant). As such, those tools only measure the amplitude of the received signal, which is sufficient to solve for the conductivity. However, if the phase of the received signal is also measured, one can additionally solve for the real and imaginary part of the complex permittivity. There is increasingly more interest in the dielectric constant since it contains information on the micro-geometry of the rock matrix.

Physics-based models explaining the frequency dependence of permittivity (and specifically the dielectric constant) attribute the variation with frequency to three effects, each of which operates in a particular frequency range. At high frequencies, where the permittivity is essentially frequency independent, the permittivity of the rock, which is a mixture of the solid matrix, water, and hydrocarbons, can be calculated using the "complex refractive index method" (CRIM), shown by Equation (5) below, $$\sqrt{\in^*_{rock}} = (1-\phi)\sqrt{\in_{matrix}} + S_{water}\phi\sqrt{\in^*_{water}} + (1-S_{water})\phi\sqrt{\in_{hydrocarbon}}. \quad (5)$$

This is a simple volumetric average of the refractive index (that is, the square root of the permittivity) of the components. Any slight frequency dependence in this range is the result of the frequency dependence of the water permittivity.

The intermediate range, where the permittivity varies as the ($-\alpha$) power of frequency, is attributed to the geometrical shape of the rock grains. The insulating grains, surrounded by conductive water, form local capacitors that respond to the applied electric field. The permittivity in this range has been described by several models, one of which, for a fully water-filled rock, is given by, $$\phi = \left(\frac{\varepsilon^*_{rock} - \varepsilon_{matrix}}{\varepsilon^*_{water} - \varepsilon_{matrix}}\right)\left(\frac{\varepsilon^*_{water}}{\varepsilon^*_{rock}}\right)^L \quad (6)$$

where L is the depolarizing factor describing the average grain shape. For example, L is ⅓ for spherical grains, and it deviates for more realistic, spheroidal grain shapes, though it remains between 0 and 1. This equation can be easily modified to include partial water saturation and the effect of hydrocarbons on the measured complex permittivity. As mentioned above, the intermediate frequency range starts at approximately 100 kHz, which is the operating frequency of most propagation and induction tools, so this expression is very applicable to the measurements from these tools and leads to a complex permittivity of water from which water salinity can be determined. The expression also provides a measure of grain shape that has further application.

At frequencies below 100 kHz, the permittivity has a 1/f dependence. This is attributed to the double layer effects caused by surface charges on the surfaces of the rock grains. The surfaces of the rock grains are charged either by the nature of the minerals at the surface, or, more importantly, by the varying amounts of clay mineral at the surface. These minerals have surface charges in contact with a cloud of oppositely charged counter-ions, forming an ionic double layer. The counter-ions respond to the applied electric field and cause a large permittivity. The permittivity in this frequency range is a clay indicator and can be used to estimate the clay concentration or cation-exchange capacity (CEC). Thus, any resistivity tool that measures the amplitude and phase of the received signal below 100 kHz can determine the conductivity and permittivity of the rock and can provide an estimate of the shale content. In addition to shale estimation, phase measurement may be used to determine a phase conductivity in addition to the traditionally measured amplitude conductivity. It has been shown that those two responses have different depths of investigations, and their combination provides a very good bed boundary indicator.

SUMMARY

The present disclosure relates to a method to determine the phase of a signal when transmitter and receiver circuits use separate clocks. A discrepancy between the separate clocks is determined, as is a correction factor between the separate clocks. The phase is determined using a measured time of arrival of the signal, the determined discrepancy, and the determined correction factor. A drift factor and an expected start time of a pulse sequence may be used to determine the discrepancy. A start time of a pulse within the pulse sequence is determined and used to determine the correction factor. The method works by either absolute synchronization of the separate clocks, or by making the measurements independent of clock synchronization.

Other aspects and advantages will become apparent from the following description and the attached claims.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
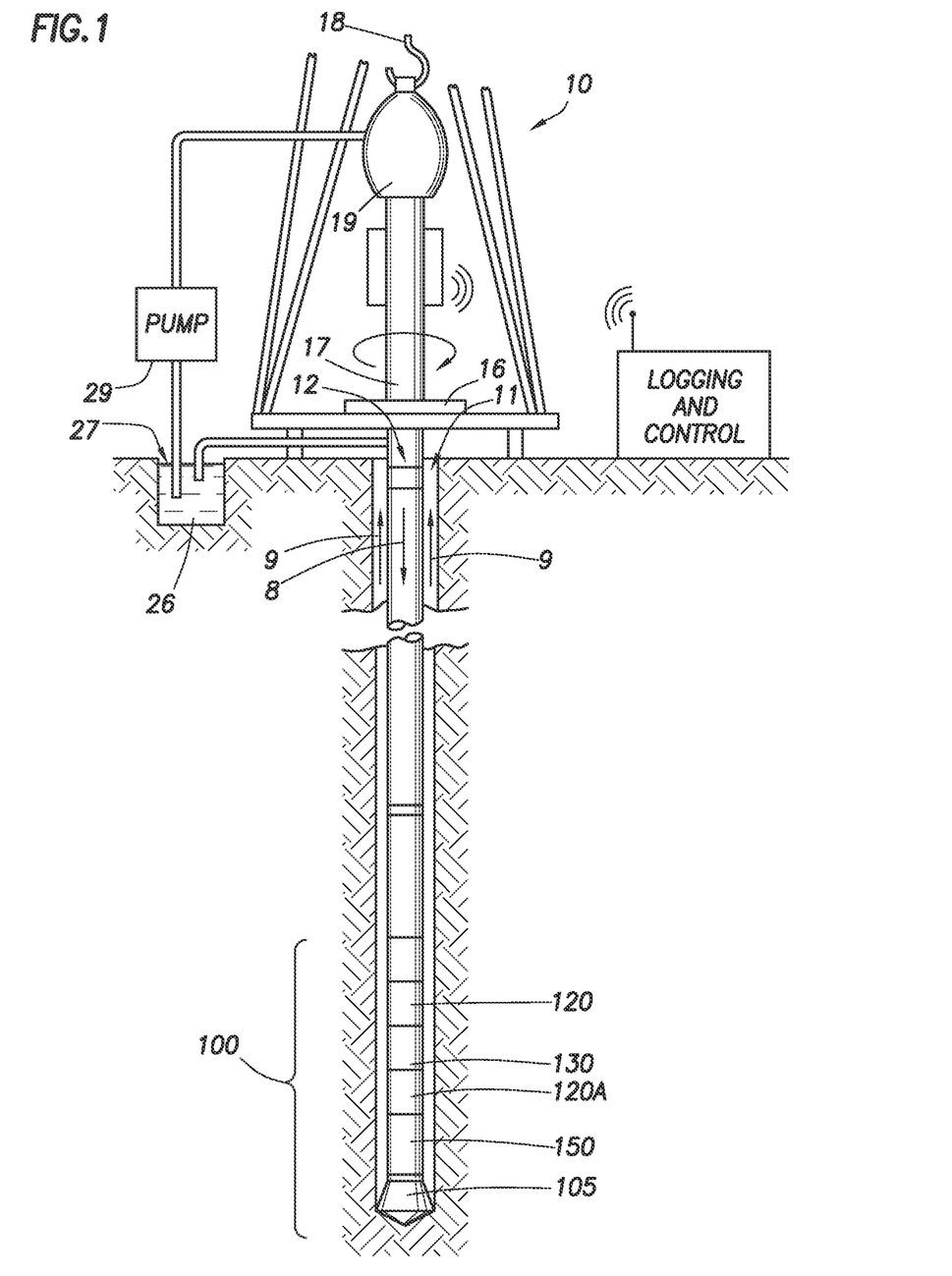
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
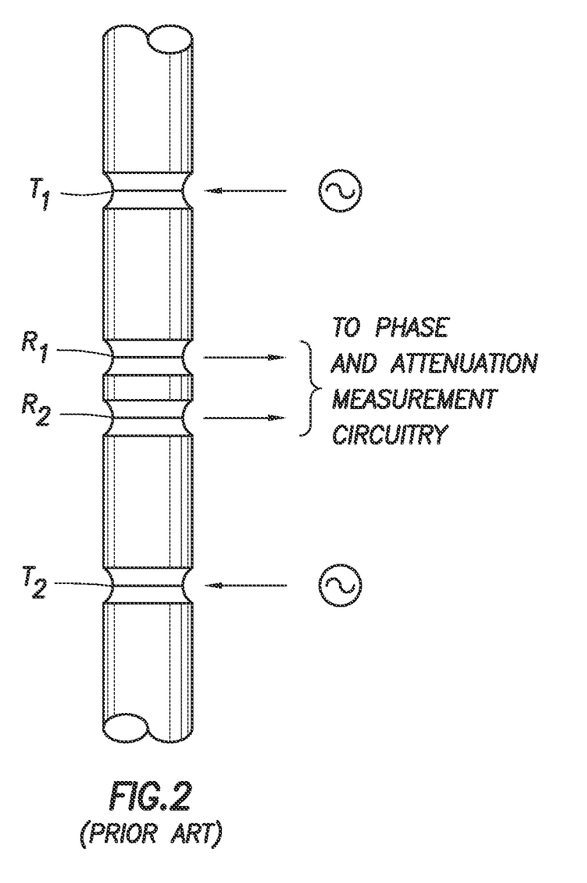
FIG. 2 shows a prior art electromagnetic logging tool.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

The phase of a received signal wherein the transmitter and receiver circuits use their own separate clocks can be measured either by absolute synchronization of the two clocks, or by making the measurements independent of the clock synchronization.

Conventional resistivity tools use a single clock in the tool to sample and record the time when the transmitter antenna is energized and when the associated wave is received by the receiver antenna. Since the time interval between the transmitting and receiving event is the parameter of interest, the clock does not have to be synchronized with any other clock. The measurement is a time difference measurement and, as such, so long as the clock does not drift during the time period when these two events take place, there is no error due to clock discrepancy.

Figure 3:
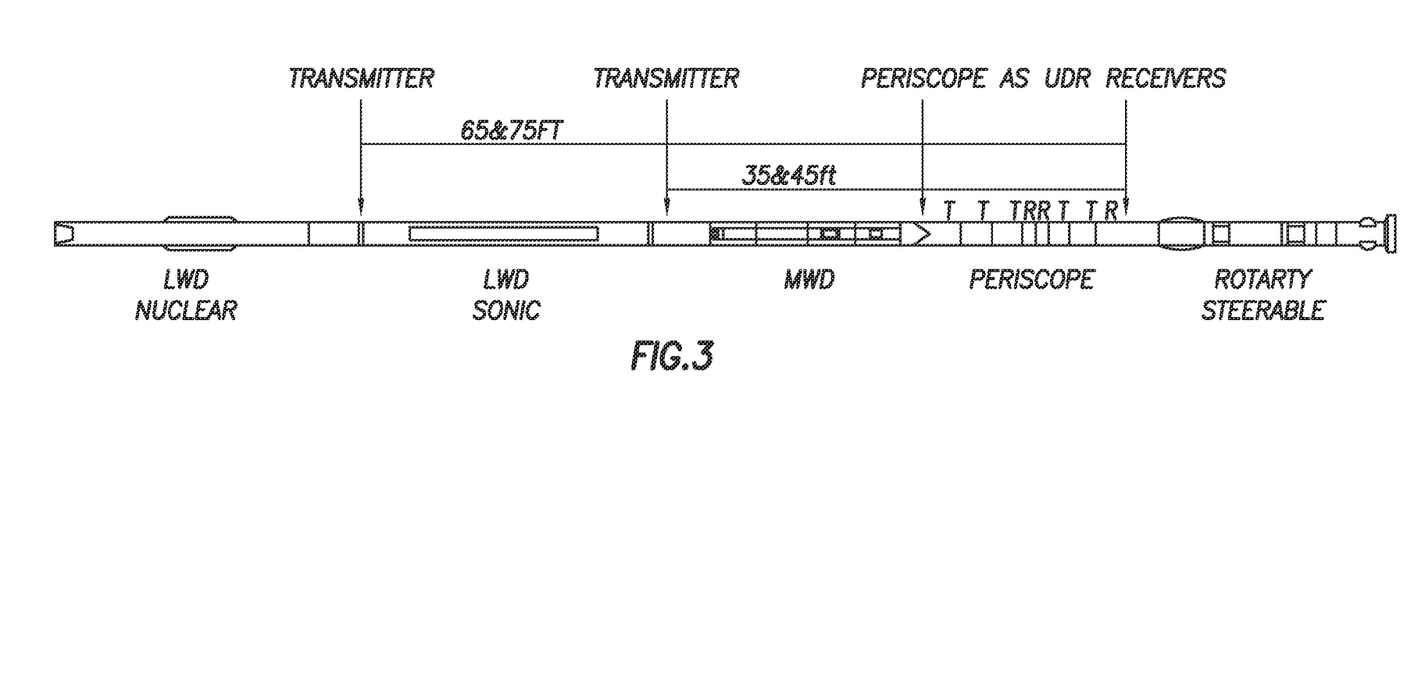
FIG. 3 is a schematic drawing of a typical modular resistivity tool with exemplary transmitter and receiver spacings, in accordance with one embodiment in the present disclosure.

Modular resistivity tools have been proposed wherein different antennas are located in different modules. These modules can be placed at different places within a bottomhole assembly (BHA), creating a desired transmitter-receiver (T-R) spacing and radial depth of investigation. Other LWD or MWD tools can occupy the space between the modules so that the space is not wasted. FIG. 3 shows an exemplary BHA containing a modular resistivity tool.

Specifically, FIG. 3 shows an arrangement of three modules in a BHA. The BHA contains a drill bit, followed by a rotary steerable sub that makes directional drilling possible. In this example, the first sub (PERISCOPE tool) is located immediately above the rotary steerable sub, but in general the locations of different modules can be different from one BHA to another. To create space between the first module and the second (Transmitter #2), an MWD sub has been used. The MWD sub serves as a spacer but also performs its own functions. If the desired distance between the modules can not be filled with an existing LWD tool, sections of drill pipe with no particular functionality can be used to achieve the desired distance. The length of BHA between the second module and the third module (Transmitter #1) is filled using an LWD sonic sub in this example. Thus, the resistivity tool in this example is made up of three modules separated by two LWD tools. The tool is located above the rotary steerable sub as shown in FIG. 3. With separate modules it is possible to choose different T-R spacing and thus different radial depths of investigations.

Since each module preferably has its own clock, the modular tool design introduces the clock synchronization and drift problems. The transmitter (TX) module and receiver (RX) module work independently, and the time of the transmitting and receiving events is usually measured by two different clocks. Although these clocks can be set to be equal before sending the tool into the borehole, the clocks have intrinsically different rates, and if left alone, the clocks will not measure the same time at a later point. In addition, downhole temperature changes can affect these clocks differently, and, since certain modules may be separated by, say, 100 ft from other modules, the clocks in the separate modules may be exposed to different local temperatures, causing another source of error.

Consider two different electronic circuits, one using a clock that we shall call "master", M, and the other using a different clock called "local", L. "M" or "L" may also be used herein to indicate or include the respective circuitry associated with the master clock, M, or local clock, L. In general, there may be multiple modules operating, and synchronization is generally needed between all modules involved in a measurement. In the embodiments described below, only two modules are used, but the method is easily extendable to as many modules as desired.

Figure 4:
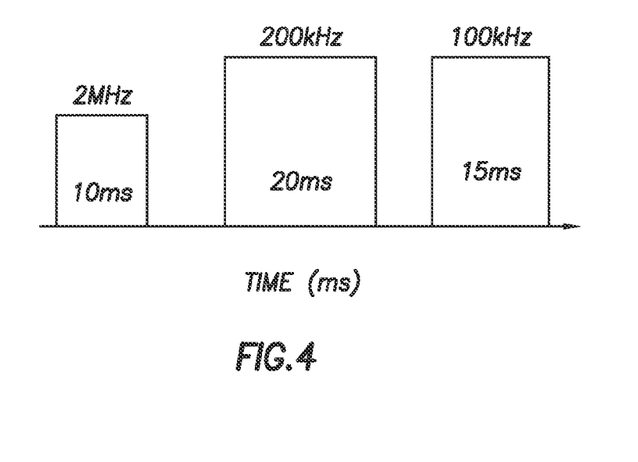
FIG. 4 shows an exemplary sequence with three frequencies, different pulse widths, and time between pulses, in accordance with one embodiment in the present disclosure.

For simplicity, assume the clock in the receiver circuit is the master, though it does not matter whether the RX or TX clock is designated as the master clock. Further consider a sequence of transmission events from the transmitter antenna. This sequence may be a preset list of pulses transmitted by the TX antenna into the formation, the sequence may have pulses of different frequency and duration, and the time between pulses may be different. An exemplary sequence for an EM logging tool is shown in FIG. 4. The transmitter may be programmed to transmit a sequence such as one shown in FIG. 4 in a repetitious fashion.

One implementation to correct the clock drift works by M sending a synchronizing pulse to start an initiating cycle. This signal is typically sent along a conductive pathway through the BHA that serves as a communication link, often referred to as a "bus". As the bus length increases, for example, with increased module spacing, the variation in the time of propagation of the synchronizing signal may become non-negligible. This variation in propagation time must be taken into account to make accurate phase measurements.

An alternative way to send the synchronizing signal is as a transmitted wave passing through the formation. This involves, for example, transmitting various signals at a given frequency for some desired time. Alternatively, some of the pulses used for sampling the formation can be used as synchronization pulses. However, the formation signal propagation time can vary and that variation must be accounted for or minimized. The effect of the formation on the propagation time is typically less than 100 ns, and if the separation between synchronization pulses is chosen to be on the order of seconds, the effect of the formation variation will be negligible. Thus, the clock frequency correction estimate can be made arbitrarily better by increasing the time between observed synchronization signals. The particular amount of time depends on the acceptable tolerance. A local clock measures the time difference between the transmitted signals and uses a priori knowledge of the timing between those transmissions (i.e., transmission sequence timing) to compute a correction factor that is accurate to within the propagation uncertainty over the interval between the received signals. Uncertainty in the formation signal propagation time is due in part to changes along the wellbore (i.e., measured depth) and changes around the wellbore (i.e., tool rotation angle). The uncertainty caused by rotation can be reduced by limiting consideration to only those signals that are acquired at the same, or nearly the same, tool rotation angle. Comparing the elapsed time between like-positioned samples measured by the local clock with the interval time between the samples according to the transmission sequence timing allows a clock frequency correction to be computed.

For the present invention, either method of sending the synchronizing pulse or signal may be used. The time between two adjacent synchronization pulses as measured by M, for example, is $(T^M_i - T^M_{i-i})$ and can be as short as the duration of one sequence, but typically is longer than the duration of a few sequences (see FIG. 5). Note that we use a superscript to specify which clock has made the measurement. The synchronizing pulses are measured by both the M and L clocks. In each case the measurement is made by the clock in the measuring circuit. Once M measures $T^M_i$, it broadcasts that value and L receives that information. L proceeds to calculate $\Delta M^M = T^M_i - T^M_{i-i}$ using the information provided, and also calculates $\Delta L^L$ from its own measurements of the same two pulses. If one clock is faster than the other, $\Delta M^M$ and $\Delta L^L$ will be different and the correction factor, $K_{ppb}$, will be different from zero, $$K_{ppb} = 1 - \frac{\Delta L^L}{\Delta M^M}. \qquad (7)$$

Figure 5:
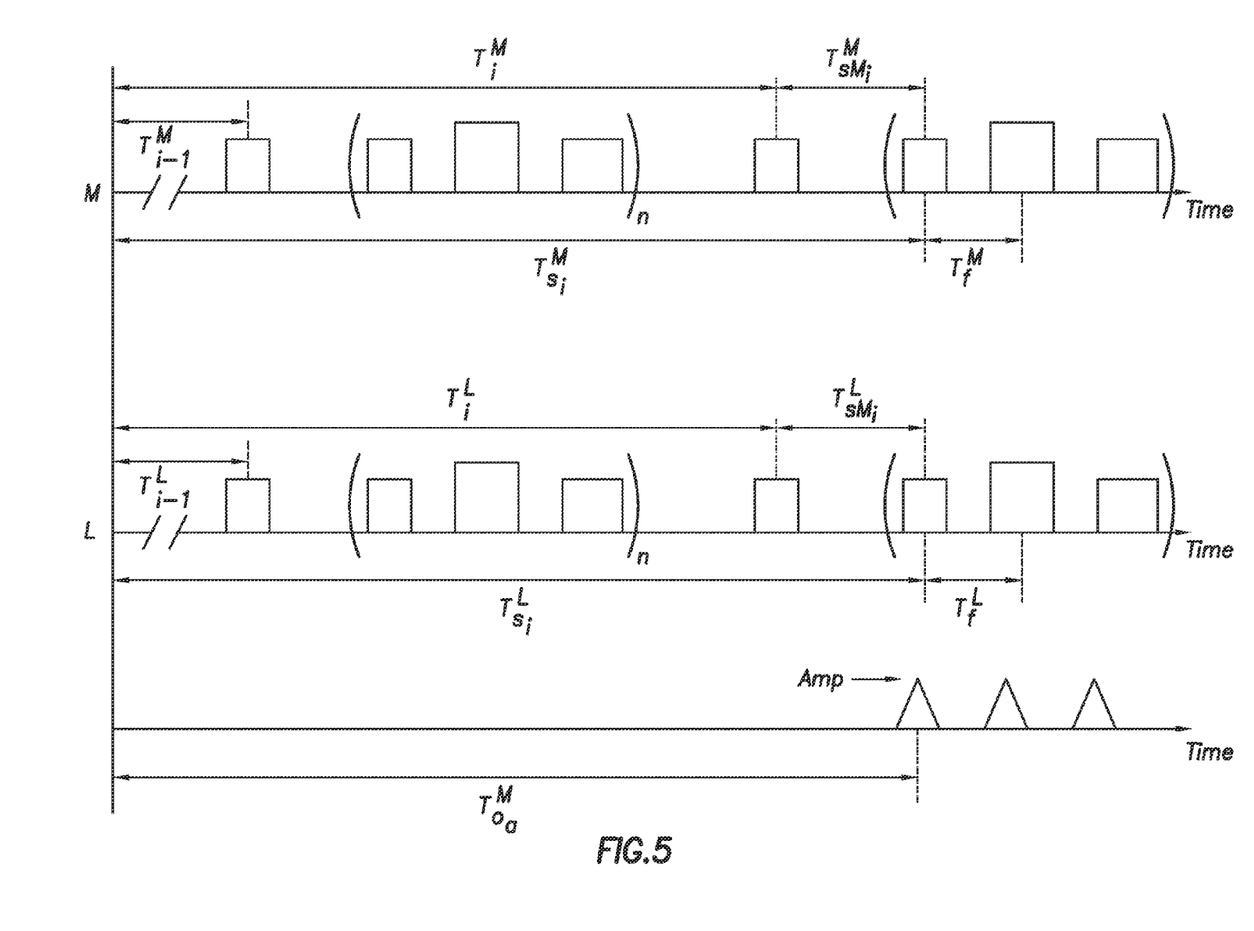
FIG. 5 illustrates various specific times and time intervals and how they relate to one another, in accordance with one embodiment in the present disclosure.

Note that $K_{ppb}$ depends on the time difference between synchronizing pulses and is independent of the absolute time reading of either clock. Also, $K_{ppb}$ is greater than zero if L is slower than M. L also calculates the expected times for starting the next sequence by the two clocks, namely $T_{si}^L$ and $T_{si}^M$, as shown schematically in FIG. 5. Those values relative to the synchronization pulse will be, $$T_{SLi}^L = T_{Si}^L - T_i^L \text{ and} \qquad (8)$$

$$T_{SLi}^M = T_{Si}^M - T_i^M. \qquad (9)$$

More detailed description of how those quantities are calculated is described below. For simplicity, clock drifts are assumed to be close to constant between synchronization pulses, which allows for easy derivations. Nonetheless, if necessary, more advance filtering can be implemented through the use of past time differences of synchronization pulses. In the next step, the start sequence time measured by L is calculated with respect to M, $$T_{SLi}^M = \frac{T_{SLi}^L}{1 - K_{ppb}}. \qquad (10)$$

Having start sequence times for both clocks relative to M, they can be subtracted to calculate the discrepancy between the two clocks relative to M, $$\Delta^M_i = T_{SMi}^M - T_{SLi}^M. \qquad (11)$$

This error accounts for the lack of synchronization between the two clocks and L sends this value to M. At this point, M can use $K_{ppb}$ as calculated before, or preferably, M may interpolate an updated value for $K_{ppb}$ using information from the previous cycle, $$K_{ppb} = -\frac{(\Delta^M_i - \Delta^M_{i-1})}{(T_{Si}^M - T_{Si-1}^M) - (\Delta^M_i - \Delta^M_{i-1})}. \qquad (12)$$

The starting time of one of the pulses within the sequence relative to the start time of the sequence is $T_f$. This parameter, if measured by L and transformed in reference to M, is, $$(T_f^L)^M = \frac{T_f^L}{1 - K_{ppb}}. \qquad (13)$$

The difference as calculated below is the correction for a pulse within the sequence, $$\Delta T_f^M = T_f^M - (T_f^L)^M. \qquad (14)$$

Having this correction, one may calculate the phase by, $$\phi = [(Toa^M + \Delta T_f^M + \Delta_i^M) \% (1/f)] 2\pi f \qquad (15)$$

where we use the "%" notation for the modulo or modulus operator, and $Toa^M$ is the measured time of arrival, as measured by M.

Figure 6:
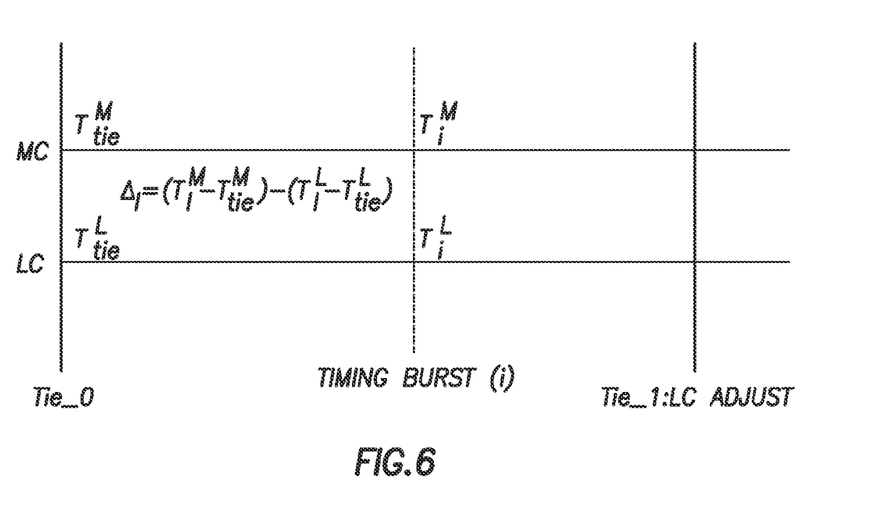
FIG. 6 illustrates how to synchronize the subs with the master clock, in accordance with one embodiment in the present disclosure.

The acquisition sequence of each sub has to be synchronized to avoid any potential conflict. All subs have to synchronize with the master clock. A local clock may drift slightly relative to the master clock, however, it should be readjusted once the drift exceeds a prescribed threshold. Every timing signal provides the actual clock difference between the master clock and the local clock. Let $T_i^L$ and $T_i^M$ be the TOA of a timing signal, i, in local clock and master clock, respectively. We can establish a "tie" point as shown in FIG. 6. At the particular instant of a tie point, the local clock and the master clock are synchronized. After power up, the first timing signal exchange leads to the measurement of $T_{tie}^M$ and $T_{tie}^L$, and adjusting the local clock by $(T_{tie}^M - T_{tie}^L)$ establishes the first tie point, Tie_0. Note the clock adjustment may not be an actual hardware adjustment, but rather can be a correction factor that is computed and used in subsequent calculations.

Using the tie point, we can calculate the difference between the master clock and the local clock for any subsequent timing signal by referencing to the tie point, $$\Delta_i = (T_i^M - T_{tie}^M) - (T_i^L - T_{tie}^L). \quad (16)$$

For small values of $\Delta_i$, no correction is needed, but as these clock discrepancies increase, a new clock correction is needed. Whether a correction is needed is decided by comparing $\Delta_i$ with a preset value $\Delta_{adj\_threshold}$, where the latter is decided by the user based on the frequency of operation and the width of the excitation and receiver windows. This parameter should be long enough to minimize the number of clock adjustments, yet short enough that the signal falls within the receiver acquisition window. Let $\Delta_{adj\_i}$ be the required local clock adjustment at each timing signal exchange. Then, $$\begin{cases} \text{if } \Delta_i < -\Delta_{adj\_threshold}, & \Delta_{adj\_i} = -\Delta_{adj\_threshold} \\ \text{elseif } \Delta_i > \Delta_{adj\_threshold}, & \Delta_{adj\_i} = \Delta_{adj\_threshold} \\ \text{otherwise}, & \Delta_{adj\_i} = 0 \end{cases} \quad (17)$$

After a clock adjustment is made, we have a new tie point. Let $D_i$ be the actual amount of adjustment needed by a local clock to stay in sync with the master clock at each timing signal exchange. $D_i$ is calculated by, $$D_i = D_{i-1} + \Delta_{adj\_i}$$

if $D_i \geq 0$, $D_i = D_i \% TCT_{length}$ if $D_i < 0$, $D_i = TCT_{length} - (-D_i \% TCT_{length})$ \quad (18)

where $TCT_{length}$ is the duration of one complete TCT (tool control table) acquisition cycle. Then, we can calculate the next acquisition sequence starting time by, $$T_{si}^L = (T_i^L + D_i + TCT_{length}) - (T_i^L + D_i + TCT_{length}) \% TCT_{length} - D_i. \quad (19)$$

In normal operations, the transmitter pulses are sent as a sequence with a preset pulse width T (typically 10 ms). The receiver uses a longer receiver sampling window, $T+\Delta T$, (typically 20 ms), to capture the signal as it arrives at the receiver antenna. The measurements are performed by transmitting a series of sequential, multi-frequency, single-tone pulses. For each pulse received, the pulse amplitude and time of arrival (TOA) are determined using a matched filter technique. The time of arrival with respect to an arbitrary time reference in the receiver is converted to a phase measurement. The amplitude and phase can be further processed.

Figure 7:
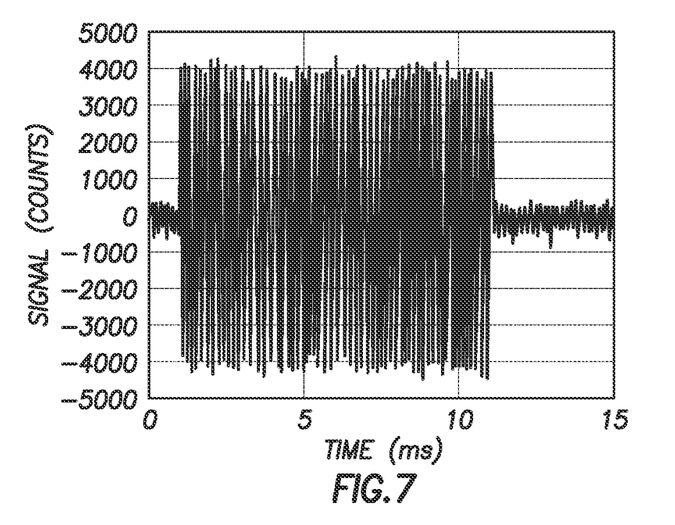
FIG. 7 shows a simulated received pulse after it has been transmitted through a formation, in accordance with one embodiment in the present disclosure.

In ideal conditions (i.e., when the clocks in the two modules are perfectly synchronized), the receiver sampling window is centered over the received signal. In practice, with transmitter/receiver synchronization to within $\Delta_{adj\_threshold}$, each received 10 ms pulse is acquired through a 20 ms window, and is over-sampled before being transferred to memory. By over-sampling, the receiver analog electronics is kept to a minimum (pre-amplifying section plus a low pass anti-aliasing filter), and the measurement processing is then fully digital, allowing flexibility in algorithm development and implementation. FIG. 7 shows a simulated received pulse after it has been transmitted through a formation. This is a pure tone carrier modulated by a square window. Other pulses with wider bandwidth can be also used, such as a pure tone convolved with a pseudorandom number (PN) sequence in order to be more resilient to coherent noise.

Figure 8:
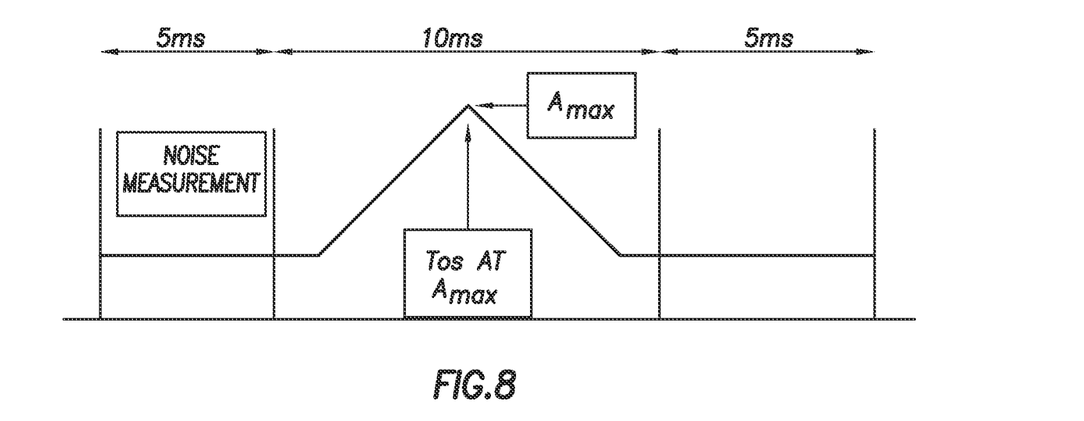
FIG. 8 shows the result of coarse processing when the pulse of FIG. 7 is match filtered.
Figure 9:
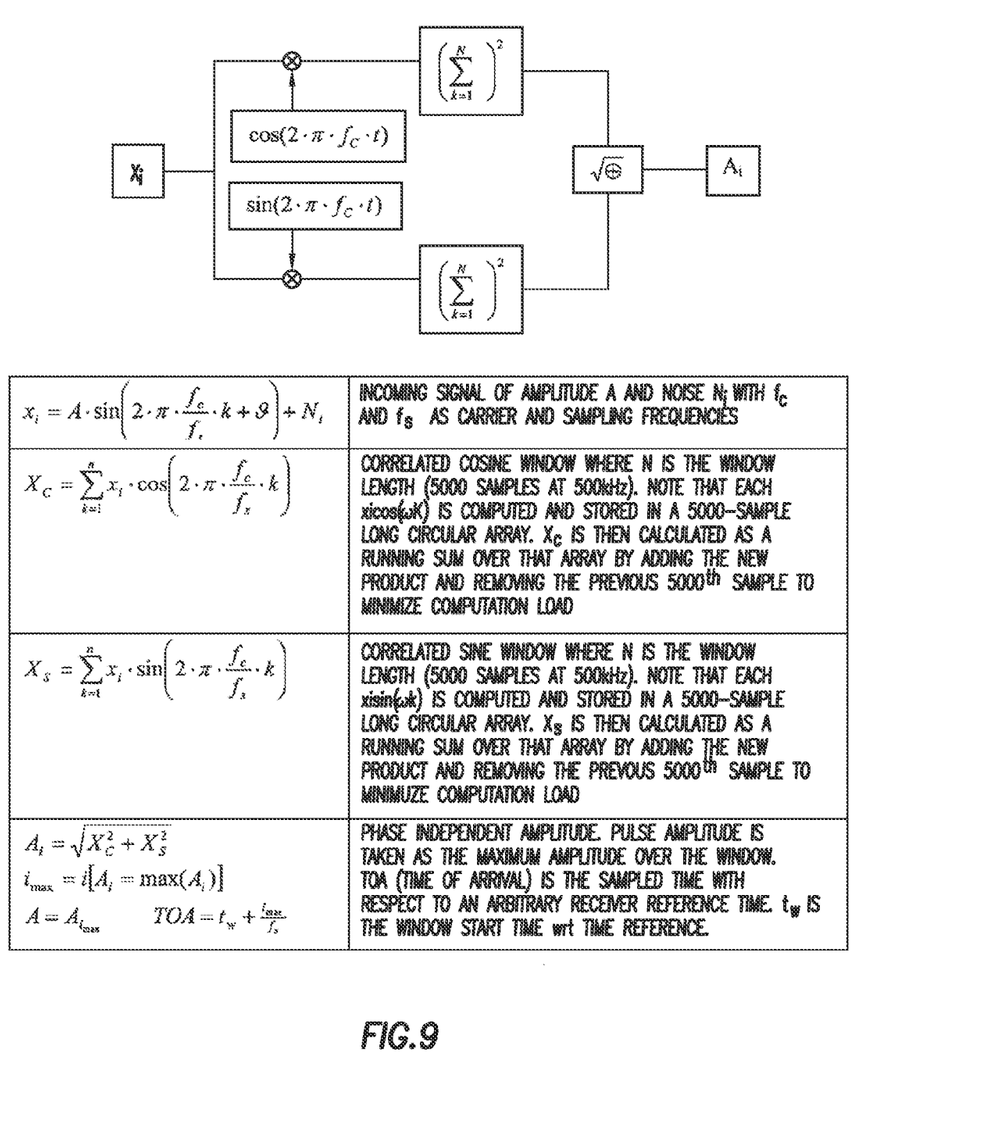
FIG. 9 shows a coarse processing flow beginning with an incoming signal and resulting in a phase independent amplitude output, in accordance with one embodiment in the present disclosure.

When the pulse of FIG. 7 is match filtered, the signal of FIG. 8 is obtained. As FIG. 8 shows, noise measurement may be performed immediately after pulse acquisition. The signal of FIG. 8 is the result of coarse processing, which is described below. Once the pulse waveform is acquired, cross-correlations with sliding 10 ms sine and cosine reference arrays are applied to the received signal to determine the amplitude and TOA to within the sampling time accuracy (coarse processing). Application of a matched filter provides the best signal-to-noise ratio (SNR). The processing diagram with the formulas used is shown in FIG. 9. The result from processing a simulated square window 100 kHz pulse is a typical demodulation triangle. For coarse processing, nominal carrier frequencies are preferably chosen so that the reference cosine and sine functions can be stored in tables of minimum size. Another broadband synchronization pulse would give a sharper cross-correlation and could enhance the coarse estimation.

Once a coarse estimation has been made, an accurate determination of the TOA and amplitude may be performed using an accurate measurement of the clock discrepancy factor. The processing is similar to the coarse processing except that now a time-reversed signal corresponding to a matched filter is moved at the carrier frequency as seen by the receiver. The received signal will be seen as a signal with a shifted carrier frequency, as is evident from the formula below (corresponding to a square window modulated sine wave), with $\Phi$ taken as the offset of the pulse waveform within one sampling time difference, $$x_i = A \cdot \sin\left(2 \cdot \pi \cdot \frac{f_c}{f_s} \cdot (1 + K_{ppm} \cdot 10^{-6}) \cdot k + \Phi\right) + N_i. \quad (20)$$

The fine TOA is estimated by first applying a Blackman (tapered) window around the received signal to remove the edge effect. The processing will then filter the synchronization signal with the analytic representation of the impulse response of the matched filter. For the case of the square window modulated with a sine wave, that will be a sine and cosine. The optimum location of the peak maximum is estimated to within one sampling time. At the maximum, the optimum TOA with accuracy better than the sampling time is obtained using, $$TOA_{fine} = \left(\frac{\Phi}{2\pi}\right) \cdot \frac{1}{f_c \cdot (1 + K_{ppm} \cdot 10^{-6})} \quad (21)$$

-continued $$\tan(\Phi) = \frac{\sum_{k=1}^{N} x_k \cdot \cos(\omega \cdot k)}{\sum_{k=1}^{N} x_k \cdot \sin(\omega \cdot k)} \text{ and} \quad (22)$$

$$\omega = 2 \cdot \pi \cdot \frac{f_c}{f_s} \cdot (1 + K_{ppm} \cdot 10^{-6}).$$

Figure 10:
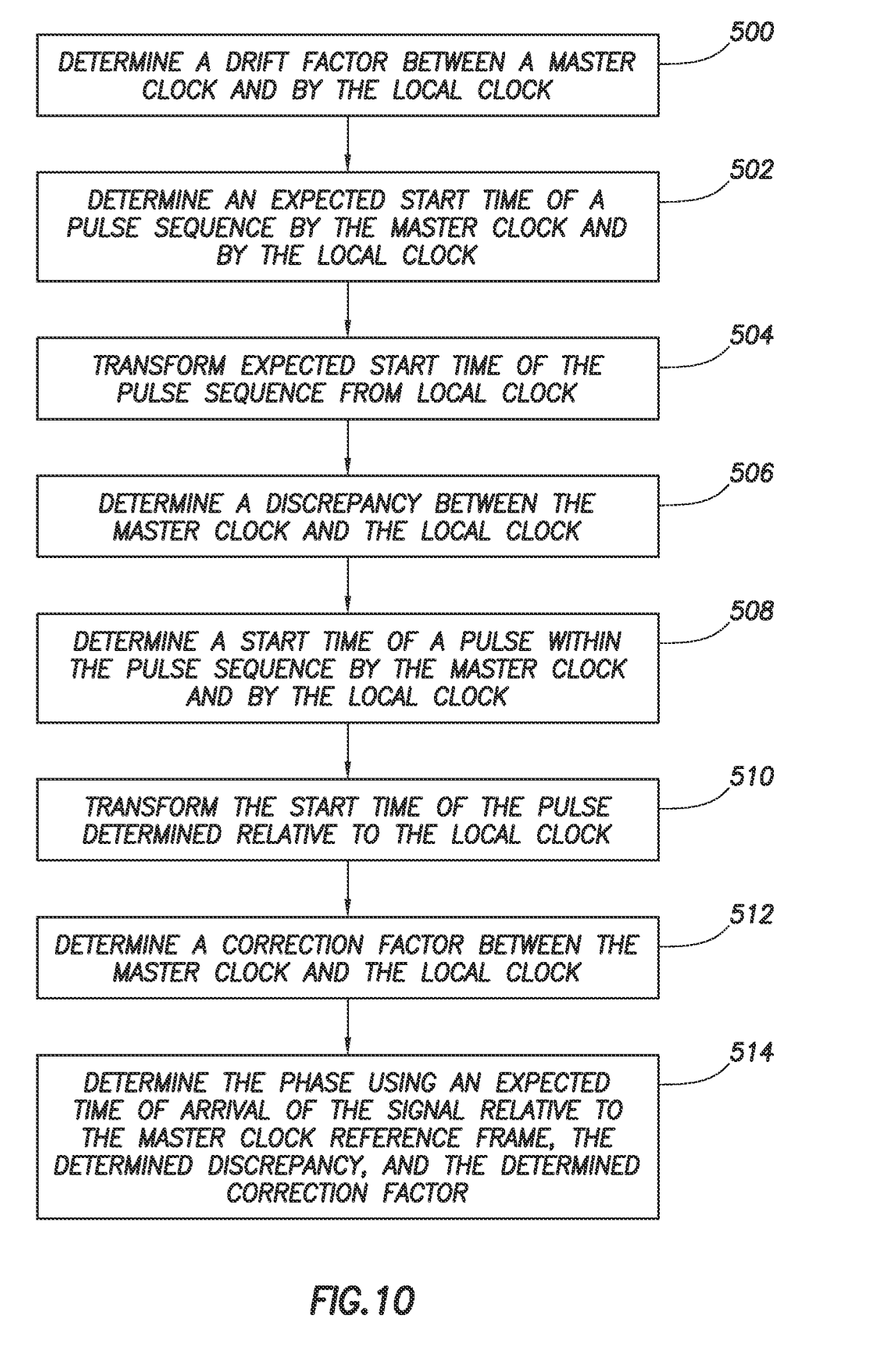
FIG. 10 is a flowchart showing the steps taken in a specific embodiment, in accordance with the present disclosure.

FIG. 10 shows steps in an exemplary embodiment to determine the phase of a signal when transmitter and receiver circuits use separate clocks. The steps comprise determining a drift factor between a master clock, measuring relative to a master clock reference frame, and a local clock, measuring relative to a local clock reference frame (step 500); determining an expected start time of a pulse sequence by the master clock, relative to the master clock reference frame, and by the local clock, relative to the local clock reference frame (step 502); transforming the expected start time of the pulse sequence determined relative to the local clock reference frame to the master clock reference frame using the drift factor (step 504); determining a discrepancy between the master clock and the local clock using the expected start time of the pulse sequence determined by the master clock and the transformed expected start time of the pulse sequence from the local clock (step 506); determining a start time of a pulse within the pulse sequence by the master clock, relative to the master clock reference frame, and by the local clock, relative to the local clock reference frame (step 508); transforming the start time of the pulse determined relative to the local clock reference frame to the master clock reference frame using the drift factor (step 510); determining a correction factor between the master clock and the local clock using the start time of the pulse determined by the master clock and the transformed start time of the pulse from the local clock (step 512); and determining the phase using an expected time of arrival of the signal relative to the master clock reference frame, the determined discrepancy, and the determined correction factor (step 514).

Figure 11:
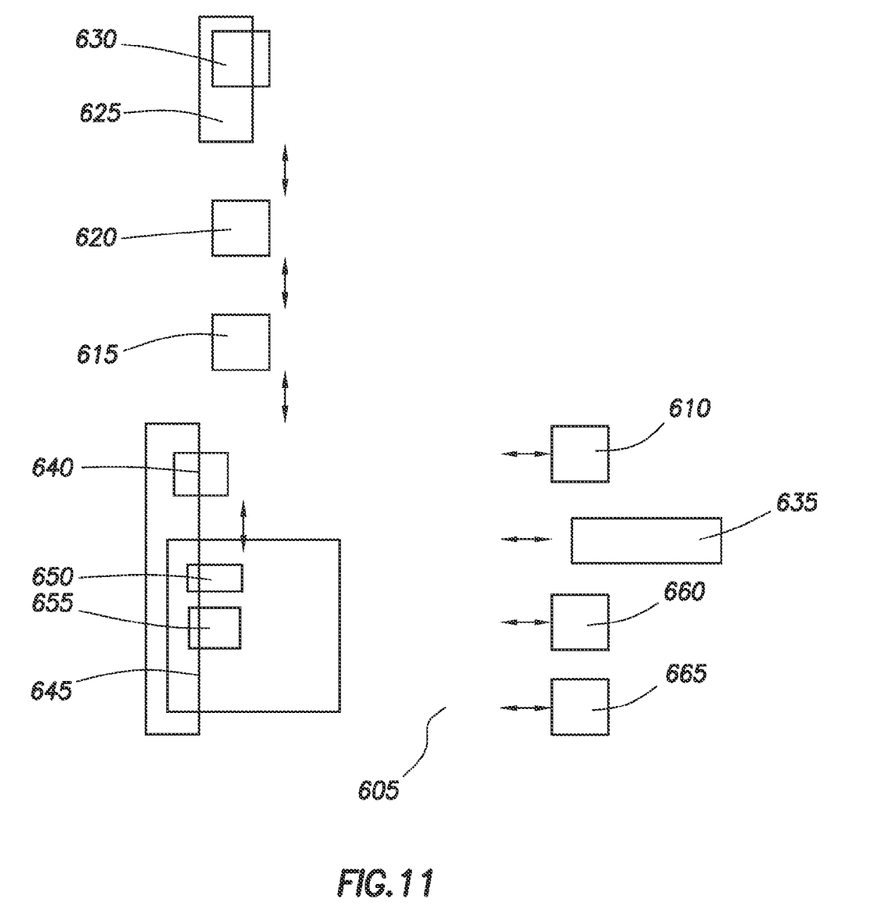
FIG. 11 schematically represents a first implementation method of a device, in accordance with the present disclosure.

FIG. 11 shows a local terminal 605 equipped with a printer 610, a means of capturing physical quantities 635, and a means of access 615 to a network 620 to which a server 625 is connected. The server 625 may be furnished with a database 630.

The local terminal 605 is, for example, a commonly used computer. The means of access 615 to the network 620 is, for example, a modem of a known type permitting access to the network 620, for example the internet. The server 625 is of a known type. The terminal 605 contains software that, when run, implements the steps in the process according to this disclosure. Alternatively, the terminal 605 does not contain specific software but implements a web browser and a web service contained in the server 625.

The terminal 605 may comprise a microprocessor 640 and memory unit 645 containing an operating system 650 and application software 655 containing instructions to implement the process according to this disclosure. Further, in a known manner, the local terminal 605 is equipped with a display screen 660 and means of control 665, for example, a keyboard and a mouse.

The use of two or more tools within a bottomhole assembly may require a coordination of operations to either prevent or assure simultaneous operations. For example, it may be desired that one tool be operated some desired time after the onset or completion of operations by another tool. That is, a function onset time (meaning, broadly, some particular phase of the operation, e.g., onset, end, peak transmission, etc.) for one tool may be specified relative to a function onset time of another tool. Other delay schemes are also possible. For simultaneous operations, the delay is set to zero or the function onset times are equal. Getting the tools to operate with the desired temporal spacing can be problematic if the tools use separate clocks. However, by determining the discrepancy and the correction factor between the separate clocks, as described above, the desired function onset time can be adjusted using the determined discrepancy and the determined correction factor. The adjusted function onset time can then be used to coordinate the operations of the tools.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a phase of a signal with transmitter and receiver modules each having circuits that use separate clocks comprising:
   disposing the transmitter and the receiver modules into a borehole in a subsurface formation;
   sending a synchronizing signal from the transmitter module to the receiver module while the transmitter and receiver modules are in the borehole;
   determining a clock difference between the separate clocks from the synchronizing signal;
   performing a hardware adjustment to at least one of the circuits to adjust at least one of the separate clocks by the clock difference to synchronize the separate clocks; and
   determining the phase with the synchronized separate clocks;
   wherein the determining the clock difference comprises:
      determining a drift factor between the separate clocks;
      determining expected start times of a synchronizing pulse sequence relative to each of the separate clocks; and
      determining the clock difference using the determined expected start times of the synchronizing pulse sequence and the drift factor;
   and wherein determining the expected start time of the synchronizing pulse sequence comprises:
      determining a time of occurrence of a final pulse in the synchronizing pulse sequence relative to each of the separate clocks;
      determining, for an adjacent, subsequent pulse sequence, a time of occurrence of a synchronization pulse of the adjacent, subsequent pulse sequence relative to each of the separate clocks;
      determining the difference between the determined time of occurrence of the final pulse in the pulse sequence and the determined time of occurrence of the synchronization pulse of the adjacent, subsequent pulse sequence relative to each of the separate clocks; and
      determining the expected start time using the determined differences.

2. The method of claim 1, wherein determining the drift factor comprises:
   sending out a first synchronizing pulse from the transmitter module at a first time and a second synchronizing pulse from the transmitter module at a second time;

determining the difference between the second time and the first time relative to each of the separate clocks; and determining the drift factor using the determined differences.

3. The method of claim 1, further comprising interpolating an updated value for the drift factor using information from one or more previous cycles.

4. The method of claim 1, wherein determining the drift factor comprises:

transmitting various signals through the subsurface formation;

receiving the signals with the receiver module;

measuring arrival times of two or more of the received signals;

determining a phase difference between two or more of the received signals using the measured arrival times; and determining the drift factor using one or more of the determined phase differences and a known transmission sequence timing.

5. The method of claim 4, wherein the determining the phase difference further comprises using the measured arrival times of only those received signals that are received at substantially equal tool rotation angles.

6. The method of claim 1, wherein the determining the clock difference comprises:

determining start times of a pulse of the synchronizing signal relative to each of the separate clocks; and determining the clock difference using the determined start times of the pulse.

7. The method of claim 1, further comprising establishing a tie point.

8. The method of claim 7, wherein establishing a tie point comprises:

measuring times of arrival of the synchronizing signal relative to each of the separate clocks; and determining the clock difference between the separate clocks using the measured times of arrival.

9. The method of claim 8, further comprising calculating a clock difference between the separate clocks for any subsequent timing signal by referencing to the tie point.

10. The method of claim 1, further comprising determining whether the hardware adjustment is to be performed by comparing the clock difference to a threshold value.

11. The method of claim 10, further comprising establishing an updated tie point if the hardware adjustment is performed.

12. The method of claim 11, further comprising calculating a next pulse sequence's expected start time using the updated tie point.

13. The method of claim 1, further comprising determining a pulse amplitude and a time of arrival for each pulse in a pulse sequence of the signal using a matched filter.

14. The method of claim 13, further comprising converting the determined times of arrival to a phase measurement.

15. The method of claim 13, wherein the determining the pulse amplitudes and the times of arrival further comprises applying a cross-correlation to the signal.

16. The method of claim 15, wherein the cross-correlation is performed using an analytic representation of an impulse response of the matched filter.

17. The method of claim 1, further comprising relating the phase of a low-frequency received signal of the signal to a shale content of a sample.

18. The method of claim 1, further comprising determining a conductivity and permittivity of a rock of the subsurface formation, and measuring a shale content using a determined amplitude and phase of the signal having a frequency less than 100 kHz.

19. A downhole logging tool to determine a phase of a signal with transmitter and receiver modules each having circuits that use separate clocks, the downhole logging tool having a non-transitory computer-readable medium having a set of computer-readable instructions encoded thereon that, when executed, perform acts comprising:

sending a synchronizing signal from the transmitter module to the receiver module while the transmitter and receiver modules are in a borehole in a subsurface formation;

determining a clock difference between the separate clocks from the synchronizing signal;

performing a hardware adjustment to at least one of the circuits to adjust at least one of the separate clocks by the clock difference to synchronize the separate clocks; and determining the phase with the synchronized separate clocks;

wherein the determining the clock difference comprises:

determining start times of a pulse of the synchronizing signal relative to each of the separate clocks; and determining the clock difference using the determined start times of the pulse; and wherein determining the expected start time of the synchronizing pulse sequence comprises:

determining a time of occurrence of a final pulse in the synchronizing pulse sequence relative to each of the separate clocks;

determining, for an adjacent, subsequent pulse sequence, a time of occurrence of a synchronization pulse of the adjacent, subsequent pulse sequence relative to each of the separate clocks;

determining the difference between the determined time of occurrence of the final pulse in the pulse sequence and the determined time of occurrence of the synchronization pulse of the adjacent, subsequent pulse sequence relative to each of the separate clocks; and determining the expected start time using the determined differences.

20. The downhole logging tool of claim 19, wherein the non-transitory computer-readable medium having the set of computer-readable instructions, when executed, perform acts further comprising:

determining whether the hardware adjustment is to be performed by comparing the clock difference to a threshold value.

21. The downhole logging tool of claim 19, wherein the non-transitory computer-readable medium having the set of computer-readable instructions, when executed, perform acts further comprising:

determining a pulse amplitude and a time of arrival for each pulse in a pulse sequence of the signal using a matched filter technique.

* * * * *